US008930149B1

(12) United States Patent
Koseoglu

(10) Patent No.: US 8,930,149 B1
(45) Date of Patent: Jan. 6, 2015

(54) RELATIVE VALUATION METHOD FOR NAPHTHA STREAMS

(75) Inventor: Omer Refa Koseoglu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 491 days.

(21) Appl. No.: 13/275,001

(22) Filed: Oct. 17, 2011

Related U.S. Application Data

(60) Provisional application No. 61/394,131, filed on Oct. 18, 2010.

(51) Int. Cl.
*G06F 19/00* (2011.01)

(52) U.S. Cl.
CPC .................................... *G06F 19/00* (2013.01)
USPC ........................................................ 702/25

(58) Field of Classification Search
CPC ................................................... G06F 19/00
USPC ....................................................... 702/25
See application file for complete search history.

(56) References Cited

U.S. PATENT DOCUMENTS

| | | | | |
|---|---|---|---|---|
| 4,251,870 | A | 2/1981 | Jaffe | |
| 5,223,714 | A | 6/1993 | Maggard | |
| 5,452,232 | A | 9/1995 | Espinosa et al. | |
| 5,490,085 | A | 2/1996 | Lambert et al. | |
| 5,572,030 | A | 11/1996 | Ranson et al. | |
| 5,600,134 | A | 2/1997 | Ashe et al. | |
| 5,699,269 | A | 12/1997 | Ashe et al. | |
| 6,258,987 | B1 | 7/2001 | Schmidt et al. | |
| 6,602,403 | B1 | 8/2003 | Steffens et al. | |
| 2002/0052769 | A1 | 5/2002 | Navani et al. | |
| 2005/0173298 | A1 * | 8/2005 | Wellington et al. | 208/14 |
| 2007/0050154 | A1 | 3/2007 | Albahri | |
| 2008/0040051 | A1 | 2/2008 | Franklin et al. | |
| 2010/0204925 | A1 * | 8/2010 | Albahri | 702/25 |

FOREIGN PATENT DOCUMENTS

WO 2006030218 A1 3/2006

OTHER PUBLICATIONS

Birch, Oil & Gas Journal, Jan. 14, 2002, pp. 54-59 (printed Jul. 9, 2014 from http://www.ogj.com/articles/print/ volume-100/issue-2/processing/achieving-maximum-crude-oil-value-depends-on-accurate-evaluation.html).

Pavlovic, Oil & Gas Journal, Nov. 22, 1999, pp. 51-56 (printed Jul. 9, 2014 from http://www.ogj.com/articles/print/ volume-97/issue-47/in-this-issue/refining/gravity-and-sulfur-based-crude-valuations-more-accurate-than-believed.html).

* cited by examiner

*Primary Examiner* — Bryan Bui
(74) *Attorney, Agent, or Firm* — Abelman, Frayne & Schwab

(57) ABSTRACT

A system and a method for determining the relative value of a naphtha stream is provided, by reforming the stream into fractions at a predetermined constant research octane number (RON), conducting PIONA analysis on the reformate, after which modules or steps are performed to calculate the feed quality, estimate the total liquid yields, estimate raw product yields, normalize raw product yields, determine the value of each fraction based on predetermined values, and calculate the total value of the naphtha stream. The method is repeated on samples from different crude oils in order to provide relative values for comparison purposes at the predetermined RON.

10 Claims, 3 Drawing Sheets

RELATIVE VALUATION METHOD FOR NAPHTHA STREAMS

RELATED APPLICATION

This application claims the benefit of U.S. Provisional Patent Application No. 61/394,131 filed Oct. 18, 2010, the disclosure of which is hereby incorporated by reference.

FIELD OF THE INVENTION

This invention relates to a method and process for the evaluation of naphtha derived from crude oil based on its composition and processability.

BACKGROUND OF THE INVENTION

There are more than 200 crude oils produced and traded worldwide. Crude oils are very complex mixtures of many thousands of different hydrocarbons. Depending on the source, the oils contain various proportions of straight and branched-chain paraffins, cycloparaffins, and naphthenic, aromatic and polynuclear aromatic hydrocarbons. The nature of the crude oil governs, to a certain extent, the nature of the products that can be manufactured from it and their suitability for specific applications.

Worldwide supply and demand, regional refining capacities and configurations, and crude composition are the key factors that determine the value of crude oil. The first factor is purely market-dependent and cannot be predicted from the crude oil quality. Accordingly, the crude oil value is determined by the regional crude market and differentials such as freight, quality adjustments, refining cost and competitive pricing.

In a typical petroleum refinery, crude oil is first distilled under atmospheric pressure. Gases will rise to the top of the distillation column, followed by lower boiling liquids, including, naphtha, kerosene and diesel oil. Naphtha is not a final product, but is subjected to additional treatment steps, such as hydrotreating and catalytic reforming to produce reformate. The reformate is then sent to a gasoline pool for blending.

An article by Colin Birch, "Achieving Maximum Crude Oil Values Depends on Accurate Evaluation," Oil & Gas Journal, Vol. 100, Issue 2 (Jan. 14, 2002), describes a number of evaluation methods for obtaining an objective calculation of the value of a specific crude oil from a particular source. Summaries of several of these methods follow.

Bulk-Property Method: This method correlates actual crude value with bulk properties. API gravity and sulfur content are widely used for the correlation, and other bulk properties, such as viscosity and pour point, can also be used. This method is relatively simple in terms of the amount of testing required. However, this method may not be reliable when a large range of crudes are being valued. For example, some of the naphthenic crudes may be valued relatively higher, using this method, but this result may not reflect the actual market value for the crude oil.

Refining-Value Method: Crude oils are evaluated and valued using the refinery yields and process operating costs for each crude stream, typically using a linear program (LP) or other model. Refinery models require detailed physical property information and distillation cuts as determined by a detailed crude oil assay. Process yields and operating costs are used with appropriate product values to calculate refining-value differentials between the crude oils. The refining-value method simulates the process used by refiners for selecting crude oils. Detailed crude oil quality information and the need to run a refinery model for a given refinery to generate the yields make this method more complex than the bulk-property method. If input stream quality changes significantly, a new set of yields must be generated. In relatively simple systems involving only a few crudes with reasonably stable quality, the refining-value method normally provides the most accurate value allocation for a refiner.

Distillation-Yield Method: This is a simplified version of the refining-value method, which instead of using a linear program or other model will only use the yield of each fraction. These product yields from distilling each crude are used with product values to calculate the relative value of each crude. In many cases, some physical properties of the distillation cuts are used in the value-adjustment system. The quality information from each crude is relatively simple and includes distillation yields and distillation cut properties. The distillation yield-method is more complex than the bulk-property method, but less complex than the refining-value method. Because it uses product values in the calculation, reliability of crude oil value data is not an issue. The products being valued, however, such as naphtha, are not finished products meeting defined specifications. So there is some uncertainty regarding the value adjustment for key properties of the distillation cuts.

Several properties of naphtha streams can be evaluated, including API gravity, sulfur, nitrogen, carbon and hydrogen contents, and research octane number. Research octane number is the measure of a fuel's ability to prevent detonation in a spark-ignition engine. Measured in a standard single-cylinder, variable-compression-ratio engine by comparison with primary reference fuels, American Standard Testing Material Tests ASTM D-2699 and ASTM D-2700 describe the determination of research and motor octane numbers, respectively. Under mild conditions, the engine measures research octane number (RON), while under sever conditions the engine measures motor octane number (MON). Where the law requires posting of octane numbers on dispensing pumps, the antiknock index (AKI) is used. This is the arithmetic average of RON and MON, namely, (R+M)/2. It approximates the road octane number, which is a measure of how an "average" car responds to fuel. It is the most critical property for naphtha/gasoline streams.

It is very difficult to evaluate the naphtha streams based on their hydrocarbon distributions. Rather, all the naphtha fractions must be brought to a commercial product stream for evaluation purposes.

The RON of a spark-ignition engine fuel is determined using a standard test engine and operating conditions to compare its knock characteristic, defined as knock intensity (K.I.) with those of primary reference fuel (PRF) blends (containing iso-octane and normal heptane) of known octane number. For example, an 87-octane gasoline has the same octane rating as a mixture of 87% iso-octane and 13% n-heptane. Compression ratio (CR) and fuel-air ratio are adjusted to produce standard K.I. for the sample fuel, as measured by a specific electronic detonation meter instrument system. A standard K.I. guide table relates engine CR to octane number level for this specific method. The fuel-air ratio for the sample fuel and each of the primary reference fuel blends is adjusted to maximize K.I. for each fuel. While gasoline will have an RON of 85 or higher, naphtha will have an RON below 60.

The MON of a spark-ignition engine fuel is determined using a standard test engine and operating conditions to compare its knock characteristic with those of PRF blends of known octane number. CR and fuel-air ratios are adjusted to produce standard K.I. for the sample fuel, as measured by a specific electronic detonation meter instrument system. A standard K.I. guide table relates engine CR to octane number level for this specific method. The fuel-air ratio for the sample fuel and each of the PRF blends is adjusted to maximize K.I. for each fuel.

Therefore, a need exists for an improved system and method for determining the value of crude oils from different sources that can be objectively applied to compare the naphtha fractions from different sources.

A further object is to provide a system and method that can be applied, for example, to compare two streams in order to ascertain which stream has a higher value based upon the current value for its constituent fractions in order to give the refiner a basis for deciding which stream should be processed first.

Another object of this invention is to provide a method for evaluation of particular naphtha streams derived from crude oils from various sources to establish an objective basis for economic comparison based on specific value.

In the following description, the terms "reformer unit", "reformer" and "reforming unit" are used interchangeably, and refer to conventional apparatus used in a catalytic reforming process.

SUMMARY OF THE INVENTION

The above objects and further advantages are provided by the invention which broadly comprehends a system and a method for determining the value of a naphtha stream by reforming the stream into fractions having a constant research octane number; the fractions are then evaluated by an algorithm, and an evaluation is obtained for the stream. When the method is applied to naphtha streams derived from crude oils from various sources, the respective value provides an objective basis for relative evaluation of the crude oil.

The system and method of the invention can be utilized to valuate naphtha fractions derived from crude oils, which fractions have nominal boiling points in the range of −11.5 to 235° C., and more preferably from 36-180° C. Naphtha fractions vary in composition and, as a result, octane number, which, as discussed above, is a key indicative property for engine-knocking characteristic. In a preferred embodiment, the comparative evaluation method is practiced on straight run naphtha samples. The difference in composition and properties make the evaluation of the naphtha fraction difficult.

In the method of the present invention, a catalytic reforming process is used to convert the naphtha with varying research octane numbers into straight run naphtha fractions, including reformate at a constant research octane. Having been brought to a commercial product stream, the reformate can now be efficiently valued. The reformate is fed into a gas chromatograph that is used to obtain an analysis of its component paraffins, iso-paraffins, olefins, iso-olefins, naphthenes and aromatics, i.e., to provide a PIONA analysis. An algorithm is applied to the total percentages of the naphthenes and aromatics in order to determine a value of the naphtha stream. The value of each of the components is assigned based upon independently determined values at a given time and place that can be predetermined by the user.

The method and system of the invention can be applied to samples derived from different crude oils obtained from different reservoirs or regions to provide relative values for the same RON in order to provide refiners with a basis for comparison in the market(s) in which their products are sold.

BRIEF DESCRIPTION OF THE DRAWINGS

Further advantages and features of the present invention will become apparent from the following detailed description of the invention when considered with reference to the accompanying drawing, in which.

DETAILED DESCRIPTION OF INVENTION

Reference will now be made in detail to implementation of the invention, examples of which are illustrated in the accompanying drawings.

Figure 1:
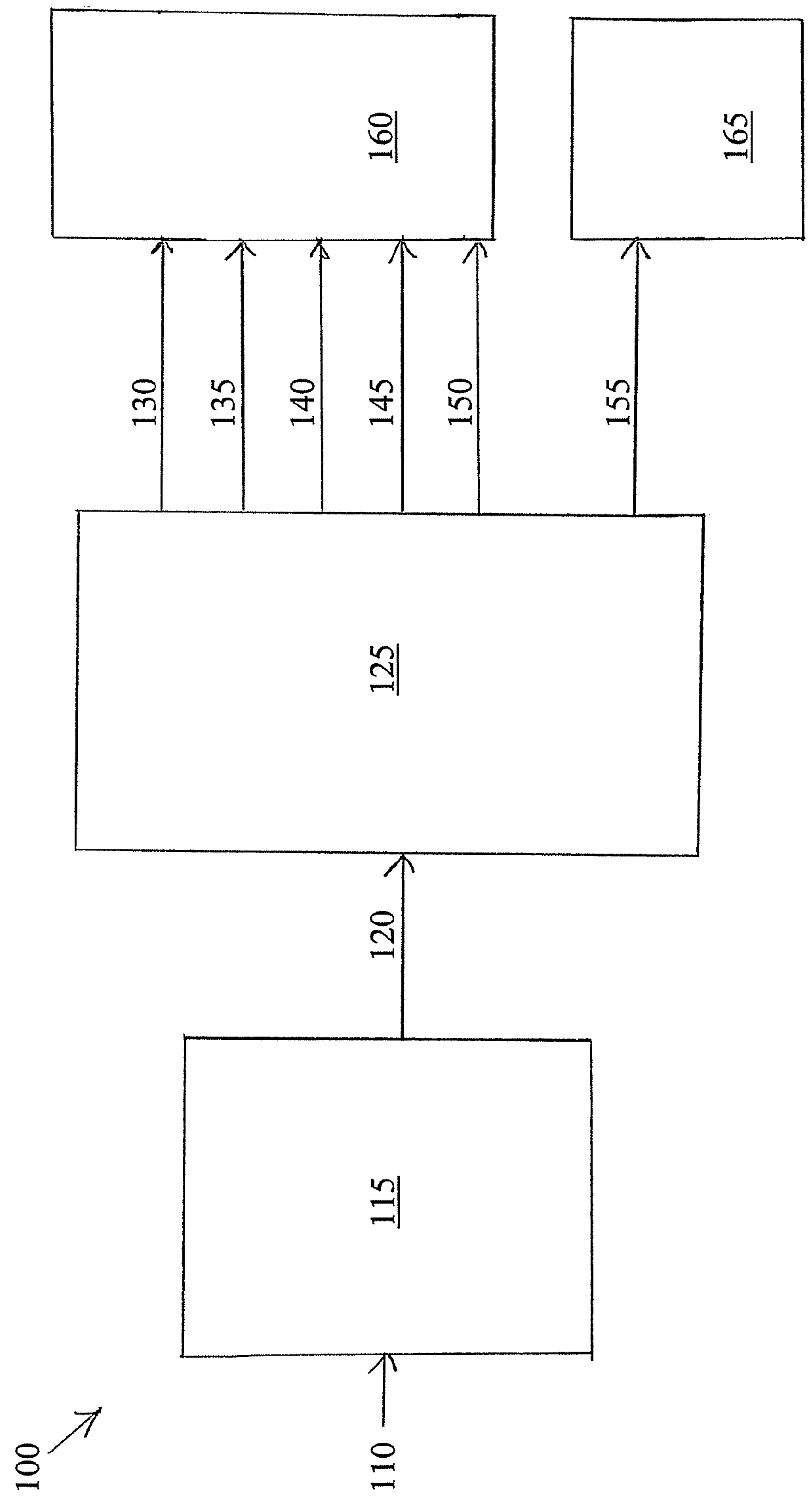
FIG. 1 schematically illustrates the hydrotreating and reformation of naphtha and the chromatograph analysis of the resultant streams.

FIG. 1 shows the hydrotreating and reforming process 100. Naphtha stream 110 is fed into a hydrotreater 115 to separately reduce sulfur levels below 0.5 ppmw, and to likewise reduce nitrogen levels below 0.5 ppmw. The maximum allowable sulfur and nitrogen contaminant content levels must be maintained within the predetermined limits established for the efficient use of the reformer unit catalyst. The reformer catalyst is made of noble metals such as platinum and palladium and is very sensitive to impurities like sulfur and nitrogen. The presence of higher levels of sulfur and nitrogen during the operation will poison the catalyst. As is known to those of ordinary skill in the art, the major sources of sulfur are inadequate hydrotreating, hydrotreating stripper upsets and the recombination of hydrogen sulfide and olefins at high temperature and low pressures. The principal sources of nitrogen are inadequate hydrotreating, cracked naphtha in the feedstock, and improper use of inhibitors. Since the reforming unit catalyst is very sensitive to impurities, it is critical to the successful practice of the evaluation method that the sulfur and nitrogen levels be reduced in the hydrotreating process to provide a reformer feedstream meeting the specification.

The hydrotreated naphtha stream 120 is then fed into a reformer 125, where it is reformed into streams of hydrogen ("H2") 130, methane ("C1") 135, ethane ("C2") 140, propane ("C3") 145, butane ("C4") 150, and reformate ("C5+") 155. The reformer 125 is operated at a severity to yield reformate having a constant research octane number, for example, a target RON of 98 can be selected. Thus, while the product yield distribution will differ for each naphtha feedstock produced, the quality of gasoline, as measured by the research octane number, will be uniform.

The predetermined octane number selected can be in the range of from 80 to 100 for products coming from the reforming unit. A more preferred value is in range of from 95 to 100, and the most preferred is in the range of from 95 to 98, which is the gasoline RON specification. It is to be noted that the yield declines with an increase in the target octane number.

The separated light gases are fed into one or more refinery gas analyzers 160, which are gas chromatographs that will analyze the gases in accordance with ASTM D1945. This analysis is not within the scope of the present invention.

The liquid reformate 155 is fed into PIONA analyzer 165, a gas chromatograph that will analyze the liquid in accordance with ASTM D6839. In the PIONA analysis, fractions of the reformate are tabulated by carbon number and n-paraffins, i-paraffins, naphthenes and aromatics, showing the percentage volume for each carbon number. As the reformate is derived from straight-run naphtha from crude oil distillation, as opposed to being derived from intermediate refinery naphtha from cracking reactions, no or few olefins are present. A typical PIONA analysis is shown in Table 1. Note that while most of the propane and butane present in the hydrotreated naphtha 120 is separated by the reformer 125 into streams 145 and 150, some propane and butane will remain dissolved in the liquid reformate product 155, and thus will appear in the PIONA analysis.

TABLE 1

EXAMPLE OF A PIONA ANALYSIS OF A NAPHTHA STREAM

| Carbon # | Hydrocarbon Family | | | |
|---|---|---|---|---|
| | n-Paraffins | i-Paraffins | Naphthenes | Aromatics |
| C3 | 0.112% | 0% | 0% | 0% |
| C4 | 2.022% | 0.212% | 0% | 0% |
| C5 | 6.232% | 2.626% | 0.494% | 0% |
| C6 | 8.697% | 6.114% | 3.086% | 0.751% |
| C7 | 12.749% | 16.033% | 5.545% | 1.985% |
| C8 | 5.288% | 6.006% | 3.017% | 2.448% |
| C9 | 3.02% | 3.829% | 2.019% | 1.893% |
| C10 | 1.304% | 2.159% | 0.819% | 0.968% |
| C11 | 0.084% | 0.25% | 0.221% | 0.017% |
| Total* | 37.29% | 36.77% | 14.98% | 8.05% |

*Total = 97.09 V %, losses = 2.91 V %. (i.e., the yields are not normalized.)

Figure 2:
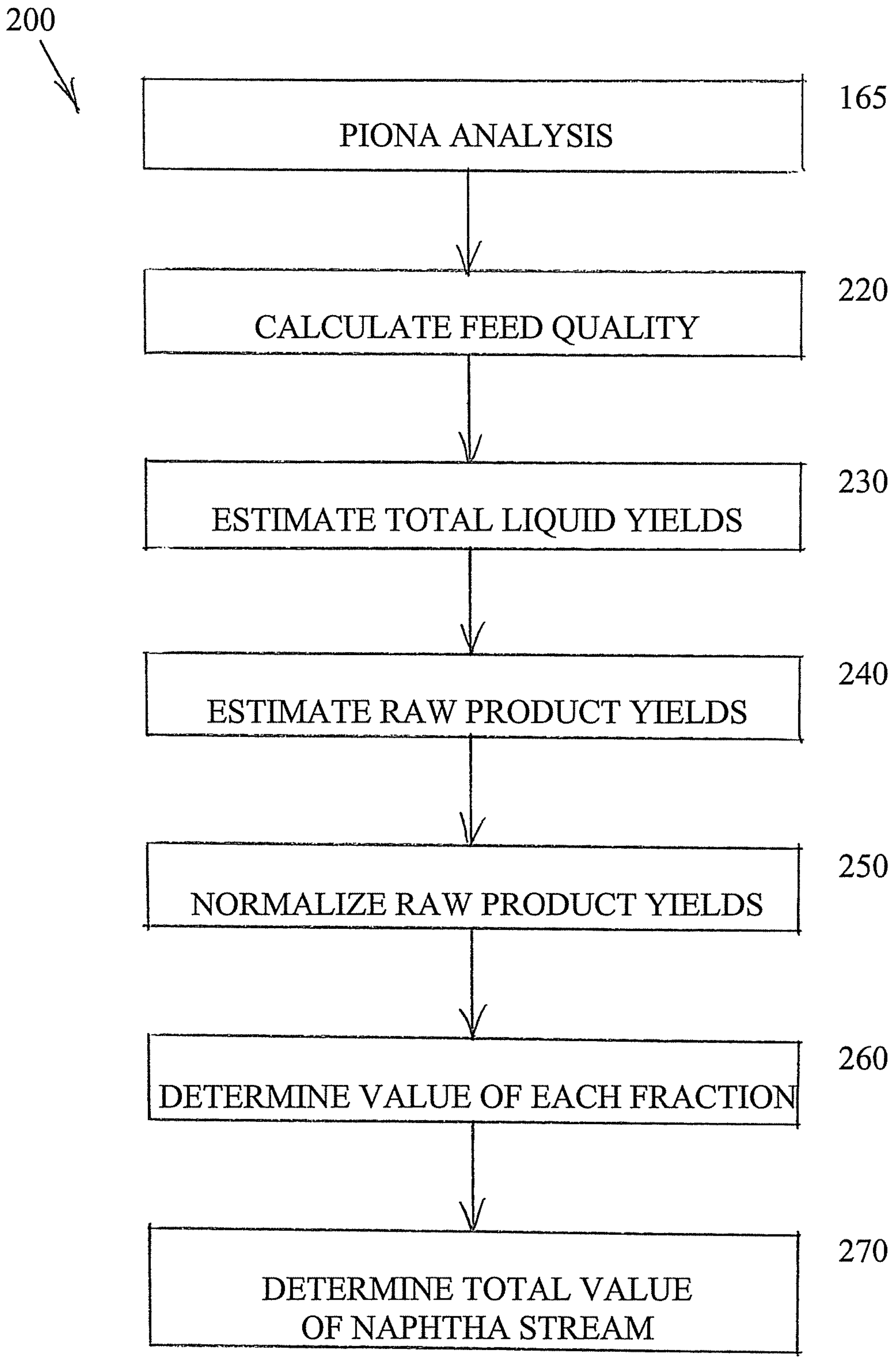
FIG. 2 is a process flow diagram of additional steps carried out to establish a value for naphtha streams using the system and method of the present invention.

FIG. 2 shows a preferred embodiment of the present invention, representing a process flowchart of steps that occur after the PIONA analysis is completed and the results are tabulated. Variable N is used to represent the total percentage of naphthenes by volume, and variable A is used to represent the total percentage of aromatics by volume, as derived from the PIONA analysis.

In step 220, the feed quality is calculated as:

$$\text{Feed quality}=N+2A \quad (1)$$

Thus, in the example given in Table 1, N=14.98, A=8.05, and therefore the feed quality, N+2A=14.98+2*8.05=31.08.

Equations for determining the total reformer yield were developed from a linear regression of the N+2A concentration versus total yield. The individual yields for H2, C1, C2, C3, C4 and C5+ and the reformate yield were then calculated from a linear regression of the total reformate yield versus individual yields at the targeted octane number.

In step 230, the total liquid yield, Y, is estimated as a function of the feed quality and the constant RON number (i.e., the target number), Rt:

$$Y=KYa*(N+2A)^2+KYb*(N+2A)+KYc*Rt^2+KYd*Rt+KYe \quad (2)$$

where KYa through KYe are constants. In a preferred embodiment, KYa=−0.01702; KYb=2.192; KYc=−0.03333; KYd=5.531; and KYe=−206.63.

Thus, for the example given in Table 1, when a target octane number for gasoline of 98 is selected, the equation is as follows:

$$Y=(-0.01702)*(31.08)^2+2.192*31.08-0.03333*(98)^2+5.531*98-206.63; \text{ or } Y=66.99.$$

In step 240, the estimated raw product yields for methane, ethane, propane, butane and gasoline are modeled linearly based upon the total liquid products variable, while hydrogen is modeled linearly based upon the total liquid products variable and the constant RON number, Rt, as follows:

$$\text{Raw Methane Yield, } C1r=KC1ra*Y+KC1rb \quad (3)$$

$$\text{Raw Ethane Yield, } C2r=KC2ra*Y+KC2rb \quad (4)$$

$$\text{Raw Propane Yield, } C3r=KC3ra*Y+KC3rb \quad (5)$$

$$\text{Raw Butane Yield, } C4r=KC4ra*Y+KC4rb \quad (6)$$

$$\text{Raw Gasoline Yield, } Gr=KGra*Y+KGrb \quad (7)$$

$$\text{Raw Hydrogen Yield, } Hr=KHra*Y+KHrb*Rt+KHrc \quad (8)$$

where KC1ra through KC4rb, KGra, KGrb, and KHRA through KHrc are constants derived by linear regression analysis. In a preferred embodiment, KC1ra=−0.12393; KC1rb=11.42; KC2ra=−0.17991; KC2rb=16.8; KC3ra=−0.25714; KC3rb=24.24286; KC4ra=−0.28705; KC4rb=27.27143; KGra=0.839255; KGrb=18.09532; KHra=0.0605; KHrb=0.1; and KHrc=−12.145.

Thus, for the example given in Table 1:

$$C1r=-0.12393*66.99+11.42=3.11$$

$$C2r=-0.17991*66.99+16.8=4.75$$

$$C3r=-0.25714*66.99+24.24286=7.02$$

$$C4r=-0.28705*66.99+27.27143=8.04$$

$$Gr=0.839255*66.99+18.09532=74.32$$

$$Hr=0.0605*66.99+0.1*98-12.145=1.71$$

The estimated total raw yield is the sum of the estimated raw yields for these components:

$$\text{Total Raw Yield, } Tr=C1r+C2r+C3r+C4r+Gr+Hr \quad (9)$$

Thus, in the present example, $$Tr=3.11+4.75+7.02+8.04+74.32+1.71=98.95$$

In step 250, the yields are normalized to 100 by dividing the individual raw yields by the total raw yields, as follows:

$$\text{Normalized Methane Yield, } C1n=(C1r*100)/Tr \quad (10)$$

$$\text{Normalized Ethane Yield, } C2n=(C2r*100)/Tr \quad (11)$$

$$\text{Normalized Propane Yield, } C3n=(C3r*100)/Tr \quad (12)$$

$$\text{Normalized Butane Yield, } C4n=(C4r*100)/Tr \quad (13)$$

$$\text{Normalized Gasoline Yield, } Gn=(Gr*100)/Tr \quad (14)$$

$$\text{Normalized Hydrogen Yield, } Hn=(Hr*100)/Tr \quad (15)$$

Thus, for the example given in Table 1, $$C1n=(3.11*100)/98.94917=3.14$$

$$C2n=(4.75*100)/98.94917=4.80$$

$$C3n=(7.02*100)/98.94917=7.09$$

$$C4n=(8.04*100)/98.94917=8.13$$

$$Gn=(74.32*100)/98.94917=75.11$$

$$Hn=(1.71*100)/98.94917=1.73$$

In step 260, the estimated yield of each fraction is multiplied by its unit value, to provide the value of each fraction:

$$\text{Value of Methane, } C1v=(C1n/100)*C1P, \text{ where } C1P \text{ is methane's value} \quad (16)$$

$$\text{Value of Ethane, } C2v=(C2n/100)*C2P, \text{ where } C2P \text{ is ethane's value} \quad (17)$$

$$\text{Value of Propane, } C3v=(C3n/100)*C3P, \text{ where } C3P \text{ is propane's value} \quad (18)$$

Value of Butane, $C4v=(C4n/100)*C4P$, where $C4P$ is butane's value (19)

Value of Gasoline, $Gv=(Gn/100)*GP$, where $GP$ is gasoline's value (20)

Value of Hydrogen, $Hv=(Hn/100)*HP$, where $HP$ is hydrogen's value (21)

Thus, if unit values are, for methane, C1P=$152.44/ton; for ethane, C2P=$149.81/ton; for propane, C3P=$343.71/ton; for butane, C4P=$499.03/ton; for gasoline, GP=$601.63/ton; and for hydrogen, HP=$391.60/ton, then the value of those products in the naphtha stream of Table 1 would be calculated as:

$C1v$=(3.14/100)*$152.44/ton=$4.80/ton $C2v$=(4.80/100)*$149.81/ton=$7.19/ton $C3v$=(7.09/100)*$343.71/ton=$24.37/ton $C4v$=(8.13/100)*$499.03/ton=$40.57/ton $Gv$=(75.11/100)*$601.63/ton=$451.88/ton $Hv$=(1.73/100)*$391.60/ton=$6.77/ton In step 270, the total value of the naphtha stream is then estimated by summing the calculated values of the individual streams:

Naphtha Unit Value ($/ton), $NPT=C1v+C2v+C3v+C4v+Gv+Hv$ (22)

For the example given in Table 1, the value of the naphtha stream calculated by this method is:

$NPT$=4.80+7.19+24.37+40.57+451.88+6.77, or $NPT$=$535.58/ton.

The value of the naphtha stream can also be restated as $/barrel, by dividing the value expressed as $/ton by the density and multiplying by the number of liters in a barrel of oil (159 liters/barrel):

$NPB=(NPT/\text{Density})*159$ liters/barrel (23)

For the example given in Table 1, with a density of 750 liters/ton, $NPB$=($535.58/ton/750 liters/ton)*159 liters/barrel=$113.54/barrel.

When two naphtha streams are to be evaluated, this process can readily be used to calculate the value of one stream relative to the other.

Figure 3:
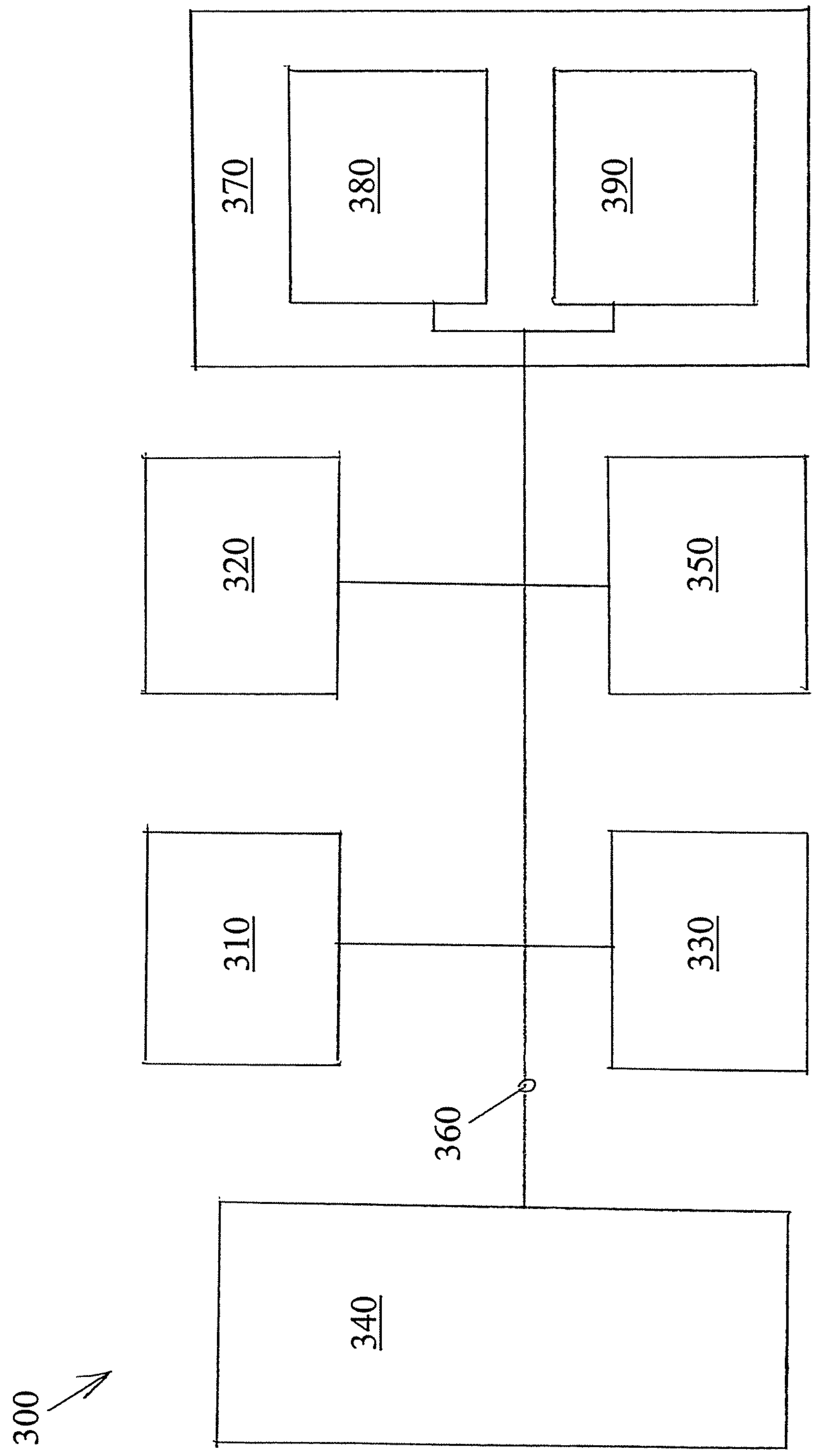
FIG. 3 is a block diagram of a component of a system for implementing the invention for establishing a value for naphtha streams, according to one preferred embodiment of the present invention.

FIG. 3 illustrates one embodiment of the present invention, implemented in a computer system 300, with a number of modules. Computer system 300 includes a processor 310, such as a central processing unit, an input/output interface 320 and support circuitry 330. In certain embodiments, where the computer 300 requires direct human interaction, a display 340 and an input device 350 such as a keyboard, mouse or pointer are also provided. The display 340, input device 350, processor 310, input/output interface 320 and support circuitry 330 are shown connected to a bus 360 which also connects to a memory unit 370. Memory 370 includes program storage memory 380 and data storage memory 390. Note that while computer 300 is depicted with the direct human interface components of display 340 and input device 350, programming of modules and importation and exportation of data can also be accomplished over the interface 320, for instance, where the computer 300 is connected to a network and the programming and display operations occur on another associated computer, or via a detachable input device, as are well known in the art for interfacing programmable logic controllers.

Program storage memory 380 and data storage memory 390 can each comprise volatile (RAM) and non-volatile (ROM) memory units and can also comprise hard disk and backup storage capacity, and both program storage memory 380 and data storage memory 390 can be embodied in a single memory device or separated in plural memory devices. Program storage memory 380 stores software program modules and associated data. Data storage memory 390 stores data used and/or generated by the one or more modules of the present invention.

It is to be appreciated that the computer system 300 can be any general or special purpose computer such as a personal computer, minicomputer, workstation, mainframe, a dedicated controller such as a programmable logic controller, or a combination thereof. While the computer system 300 is shown, for illustration purposes, as a single computer unit, the system can comprise a group/farm of computers which can be scaled depending on the processing load and database size, e.g., the total number of samples that are processed and results maintained on the system. The computer system 300 can serve as a common multi-tasking computer.

The computing device 300 preferably supports an operating system, for example, stored in program storage memory 390 and executed by the processor 310 from volatile memory.

The system and method of the present invention have been described above and with reference to the attached drawings; however, modifications will be apparent to those of ordinary skill in the art and the scope of protection for the invention is to be defined by the claims that follow.

I claim:

1. A system for determining the relative value of a stream of treated naphtha based upon a separately provided PIONA analysis of the fractions of the naphtha after processing in a reformer that is operated at a severity that yields a gasoline product having a predetermined constant research octane number, the system comprising:

a memory that stores calculation modules and data;

a processor coupled to the memory;

a calculation module that calculates the feed quality of the naphtha fractions;

a calculation module that estimates the total liquid products variable from the feed quality and the constant research octane number data;

a calculation module that estimates raw product yields of methane, ethane, propane, butane and gasoline from the total liquid products variable;

a calculation module that determines raw product yields of hydrogen from the total liquid products variable and the predetermined constant research octane number (RON);

a calculation module that adds the raw product yields of methane, ethane, propane, butane, gasoline and hydrogen to derive a raw product total yield;

a calculation module that normalizes the estimated yields for losses of hydrogen, methane, ethane, propane, butane and gasoline, as a percentage of the raw product total yield;

a calculation module that derives the value of the normalized estimated yields of hydrogen, methane, ethane, propane, butane and gasoline by multiplying each normalized estimated yield by a predetermined unit value of each product; and a calculation module that produces and displays an estimated value of the naphtha stream by totaling the values of the normalized estimated yields of hydrogen, methane, ethane, propane, butane and gasoline.

2. The system of claim 1 in which the treated naphtha stream contains less than 0.5 ppmw of sulfur and less than 0.5 ppmw nitrogen.

3. The system of claim 1 in which the treated naphtha stream is straight run naphtha from a hydroprocessor.

4. The system of claim 1 in which the RON is selected from the range of from 95 to 100.

5. The system of claim 4 in which the RON is selected from the range of from 95 to 98.

6. A method for operating a computer to determine the relative value of a treated naphtha stream derived from a crude oil sample obtained from a particular source, the method comprising:

entering into the computer data obtained by PIONA analysis of the fractions of the naphtha stream that is processed in a reformer operated under conditions that produce a gasoline product having a predetermined constant research octane number;

calculating the feed quality of the naphtha fractions;

estimating the total liquid products variable from the feed quality and the constant research octane number;

estimating raw product yields for methane, ethane, propane, butane and gasoline from the total liquid products variable;

determining raw product yields for hydrogen from the total liquid products variable and the predetermined constant research octane number;

adding the raw product yields for methane, ethane, propane, butane, gasoline and hydrogen to derive a raw total yield;

normalizing the estimated yields of hydrogen, methane, ethane, propane, butane and gasoline, as a percentage of the raw total yield;

calculating the value of the normalized estimated yields of hydrogen, methane, ethane, propane, butane and gasoline by multiplying each normalized estimated yield by a predetermined unit value for each;

calculating an estimated value of the naphtha stream as the total obtained by adding the values of the normalized estimated yields of hydrogen, methane, ethane, propane, butane and gasoline; and displaying and storing the calculated estimated value of the treated naphtha.

7. The method of claim 6 in which the treated naphtha stream contains less than 0.5 ppmw of sulfur and less than 0.5 ppmw of nitrogen.

8. The method of claim 6 in which the treated naphtha stream is straight run naphtha from a hydroprocessor.

9. The method of claim 6 in which the RON is selected from the range of from 95 to 100.

10. The method of claim 6 which includes the further steps of entering PIONA analyses from a plurality of samples derived from different crude oils and compiling the calculated estimated values for each of the treated naphthas to provide a listing of comparative values based upon a constant RON.

* * * * *